Patented June 2, 1931

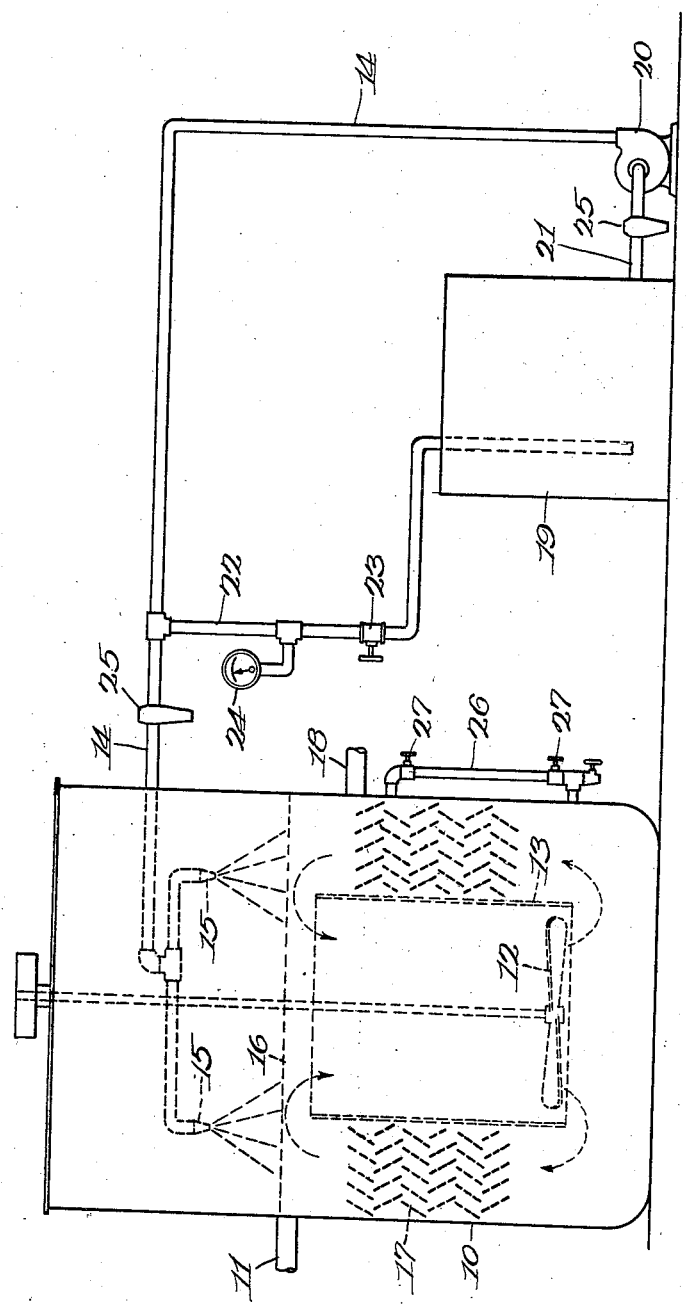

1,808,546

UNITED STATES PATENT OFFICE

WALTON C. GRAHAM, OF DENVER, COLORADO, ASSIGNOR TO GILCHRIST & COMPANY, A CORPORATION OF DELAWARE

PROCESS AND MEANS FOR CONTROLLING THE APPLICATION OF REAGENTS TO SOLUTIONS

Application filed July 2, 1925. Serial No. 41,222.

My invention relates to improvements in processes and means for controlling the application of reagents to solutions and the purification of solutions and liquids, of the character disclosed in my co-pending application No. 9,030, filed February 13, 1925.

Said process, as illustrated by the liming of sugar solutions, is carried out by heating the solution sufficiently to cause at least incipient coagulation of albumenoid material which may be contained therein, the solution then being set in motion in such a manner as to cause a thorough and rapid intermingling of the body of liquid upon itself, and at the same time adding to the same a quantity of suitable reagent in finely dispersed form, sufficient to bring the chemical or physical state or reaction of the solution to a desired degree.

The present invention relates to methods of controlling and varying the rate of application of fluid reagents, to fluids or solutions wherein the same process is preferably operated continuously; that is, where a flow of untreated material is caused to enter the apparatus and displace an equal amount of treated material, and where the application of the reagent must be continuous and at such rate and in such amounts as will correspond to the requirements and physical and chemical state of the entering solution, even though such physical or chemical state may be subject to variation.

This invention provides means and a process whereby this may be accomplished, the rate of application of the reagent being preferably controlled by visual inspection, in many cases, supplemented by such tests as may be required.

In order to make this inspection during operation, a small portion of the uniformly mixed body of the liquid is caused to pass through an inspection gauge, and return to circulation, this inspection gauge consisting mainly of a tube of transparent material, as glass, having necessary valves at each end for retarding or stopping the flow, if desired, and means for withdrawing a sample, and having a light so arranged as to throw the liquid circulating through the inspection tube into relief and thus exhibiting plainly various of its properties, such as color, clearness and physical state of suspended solids, by means of which the condition of the body of liquid may be judged.

If desired, one of the valves may be closed to hold the liquid within the glass tube quiescent momentarily, for closer inspection, and upon opening the valve the movement of the liquid through the inspection gauge will be resumed. If, upon inspection or testing, the state of the body of liquid be found to be as desired, no change in the rate of addition of reagent is made, but if, as may happen, it be found that there is a slight deficiency of reagent, it is then necessary to increase the rate of addition, or the reverse. By frequent observation and testing at intervals corresponding to the probable variations in requirements and by increasing or decreasing the flow of reagent in accordance with these observations and tests, the physical or chemical state of the treated liquid flowing from the apparatus may be maintained within very narrow limits, and close enough to a given standard for all practical purposes.

The object of the present invention is to provide simple, convenient and practical means for accurately and continuously controlling and varying the rate of application of a liquid reagent in accordance with requirements as determined by visual observation and tests.

In the accompanying drawing I have illustrated, somewhat diagrammatically, suitable apparatus for carrying out the invention wherein the liquid reagent is maintained under pressure, and means for varying the pressure in the system, and the rate of discharge of the reagent from the system.

The fluid material to be treated is introduced into the chamber 10 through a suitably located inlet 11 and is circulated by means of the propeller 12 located within an inner receptacle 13. The reagent may be introduced by means of the pipe 14 and the constricted openings formed by the spray nozzles 15 by which means it is deposited upon the surface of the body of circulating liquid, as at 16. During the circulation of said liquid it is thoroughly mixed with said reagent by passing through baffle plates 17, as described more fully in the said earlier application. The reagent being thoroughly incorporated, the treated liquid flows out at 18 in proportion as the untreated liquid enters at 11.

The reagent is stored in a suitable tank 19 from which it is withdrawn by a pump 20 through the pipe 21 and discharged into the pipe 14. A further pipe line 22 connects line 14 with the tank 19, the line 22 being provided with a suitable valve 23 and a pressure gauge 24 located between the said valve and the junction of the pipes 14 and 22.

With this arrangement, it will be seen that by completely closing the valve 23, the maximum pressure which may be developed by the pump will be applied to the openings 15, and the rate of discharge of reagent will then be in proportion to that pressure, whereas, if the valve be partially opened, thus increasing the area of discharge openings from the system and returning a portion of the reagent to the tank 19, the pressure in the system will be reduced in proportion to the extent of said openings and the rate of discharge of the reagent through the nozzles will be decreased in proportion to such decrease in pressure.

It is apparent that the pressure within the system formed by the series of pipes and the pump, and proportionately the rate of discharge of the reagent into the chamber 10 may be varied by infinite gradations, by various adjustments of the valve 23, between zero pressure and the maximum capacity of the pump, and each setting of the valve will correspond to a definite pressure which will be indicated on the gauge 24, which gauge reading will serve as a standard of comparison of the various rates of application of reagent.

A screen or screens 25 may be inserted in the pipe line, if necessary, to prevent clogging of the nozzles.

In order to observe the condition of the liquid in the main tank 10, a glass tube 26 may be connected therewith, as shown, and provided with suitable valves 27, whereby a portion of the circulating liquid may be segregated and its condition noted. The proper condition of the liquid for the termination of the addition of the reagent may be determined almost instantaneously by the rapidity of settling of the flocks or particles in the portion of the liquid in the glass tube and also by its color. Regulation of valves 27 and inspection of the gauge 24 as well as inspection of the contents of the glass tube 26 enables the operator to regulate the treatment of the liquid with great accuracy and extreme ease.

The invention is particularly applicable to the treatment of solutions and fluids of the sugar industry and the metallurgical industry, but is not limited thereto.

It is further understood that in cases where it may be desired to apply two or more different reagents separately and simultaneously to the contents of the chamber 10 this may be accomplished by duplicating the pressure system, one for each reagent.

What I claim is:

1. The method of treating sugar-containing juices to remove non-saccharine colloidal impurities therefrom comprising rapidly circulating a body of the juice repeatedly within itself, adding an alkaline reagent thereto in finely dispersed form, instantly mixing the added reagent throughout the entire body of the juice thereby obtaining uniform distribution within the juice and uniform treatment thereof, circulating a part of the juice under treatment through a transparent conduit outside of the main body of the juice to enable its condition to be visually observed continuously, pumping the reagent in a closed cycle out of and back again through a stored body of reagent to keep the same continuously agitated, diverting a portion of the circulated reagent under pressure and spraying said diverted portion onto the recirculating juice, regulating the amount of reagent sprayed in accordance with the juice condition as it is visually observed to thereby gradually and progressively enable the alkaline reagent to cause the flocculation of the said impurities without local overaction affecting the sucrose present and simultaneously maintaining the speed of recirculation of the main body of juice to aid the upbuilding of the flocs and prevent deflocculation by too rapid agitation.

2. A method of treating a liquid with a reagent comprising recirculating a body of the liquid continuously, adding fresh liquid to and withdrawing treated liquid from said body continuously, spraying the reagent continuously onto a large surface of said body always at the same points in the cycle or recirculation, continuously segregating average samples of the liquid under treatment and conducting them past a point of observation and returning them thereafter to the main body of the liquid, continuously pumping a quantity of reagent from a reagent source and spraying a portion of it onto said surface, regulating the pressure of the reagent between the pump and the spray and hence varying the amount sprayed by varying a restricted return flow of the reagent from the delivery side of the pump back to said source, the amount of said pressure being varied in accordance with a characteristic of the liquid flowing past said point of observation, and simultaneously maintaining the speed of recirculation of the main body of juice to aid the upbuilding of the flocs and prevent deflocculation by too rapid agitation.

3. A method of controlling the application of a reagent to a liquid comprising recirculating a body of the liquid in a closed cycle while causing a uniform intermixing of its portions within the body, spraying the reagent through fixed openings onto the surface of the recirculating body in small amounts to effect the gradual and progressive addition of the reagent to all portions of the liquid as they recirculate back to the surface for further treatment, pumping the reagent from a source of supply and conducting some of it directly to be sprayed upon said liquid while returning to said source the balance not sprayed, segregating an average sample of the liquid while recirculating the whole and observing its condition and then regulating the return of reagent to the tank to vary the discharge pressure on the reagent being sprayed to thereby alter the treatment of the liquid by varying the rate of addition of reagent in accordance with variations of its discharge pressure and simultaneously maintaining the speed of recirculation of the main body of juice to aid the upbuilding of the flocs and prevent deflocculation by too rapid agitation.

In testimony whereof, I have subscribed my name.

WALTON C. GRAHAM.